June 27, 1972   R. BLAKEY   3,672,729
VEHICLE BRAKING SYSTEMS

Filed Oct. 15, 1970   5 Sheets-Sheet 1

United States Patent Office 3,672,729
Patented June 27, 1972

3,672,729
VEHICLE BRAKING SYSTEMS
Roy Blakey, Tyseley, England, assignor to Girling
Limited, Birmingham, England
Filed Oct. 15, 1970, Ser. No. 81,093
Claims priority, application Great Britain, Oct. 17, 1969,
51,103/69; Aug. 10, 1970, 38,442/70
Int. Cl. B60t 13/58
U.S. Cl. 303—9  9 Claims

ABSTRACT OF THE DISCLOSURE

A vehicle hydraulic brake system has separate pressure sources and separate service and emergency brake control means for supplying pressure from those sources to the individual wheel cylinder, as well as lock units and a manual control for operating the same. Pressure lines leading from the service and emergency brake control are branched into each other by means for changeover valves acting as double check valves so that any individual wheel cylinder chamber can receive pressure from a source under the control of either the service control or the emergency control, without unnecessary duplication of pipework or of wheel cylinders.

---

Figure 1:
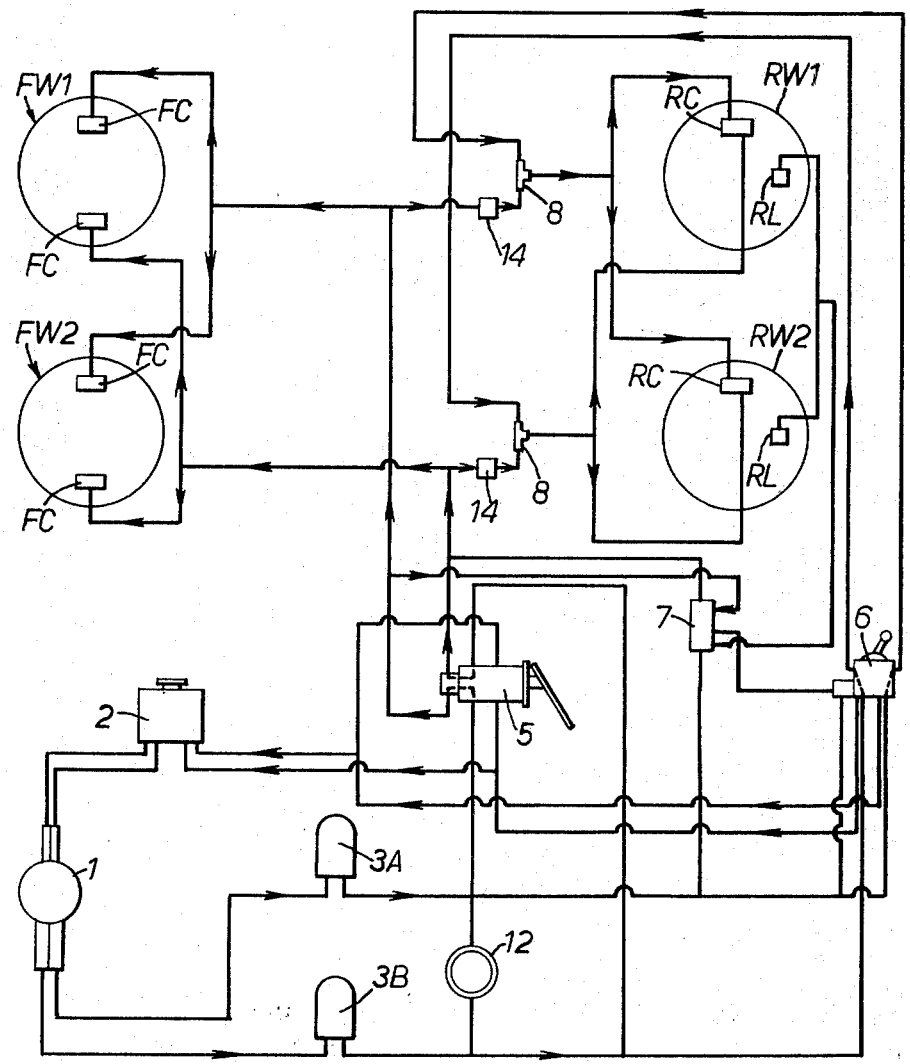

This invention relates to hydraulic vehicle braking systems including a plurality of wheel brakes each having one or more wheel cylinders, and some or all of which have fluid pressure operated lock units for holding the brakes applied to provide a parking brake facility, the system further including service brake operating means and separate emergency brake operating means both operable to supply brake actuating pressure to some or all of the wheel cylinders and manually controlled means for controlling operation of the said lock units.

The invention provides a system of above described character, in which duplicated pressure sources are employed and which may be connected to the wheel cylinders in such a manner that a completely "duplicated" system is obtained, i.e. such that complete failure of one pressure source will still leave a useful proportion of braking effort available at each of the wheel brakes.

More specifically the invention provides a hydraulic vehicle braking system, including front and rear wheel brakes, each wheel brake having wheel cylinder means having at least two working chambers to which hydraulic pressure can be independently supplied for applying the brake; lock units in at least some of the wheel brakes for holding those brakes applied mechanically for parking purposes; two separate sources of hydraulic pressure; service brake control means operable to supply hydraulic pressure from each source to at least one respective working chamber of each wheel brake; emergency brake control means to supply hydraulic pressure from each source to respective one of said working chambers on at least some of said wheel brakes manually controlled hydraulic means for controlling operation of the said lock units; and changeover valve means through which one pressure line from the emergency brake control means is branched into one pressure line from the service brake control means leading to one working chamber, the said changeover valve means acting as a check valve in one said pressure line while passing pressure from the other said pressure line to the working chamber in question.

These changeover valves will be seen to permit the supply, to individual working chambers, of pressure from either the service brake control means or the emergency brake control means. To obtain the duplicated system referred to above, the system is so arranged that each changeover valve allows pressure from one pressure source, controllable by the service brake control means or the emergency brake control means, to pass to the respective working chamber. The check valve function of the changeover valve means prevents loss of pressure from a functioning part of the system to a failed part. If pressure reducer valves are incorporated in the system, they are preferably connected between the service brake control means and the changeover valve means. This arrangement permits the use of the emergency control means for stopping the vehicle as a preliminary to parking by use of the lock units, with an undesirable reduction of the braking pressure which is to be "locked in" to the wheel cylinder chambers.

These and other features of the invention will be more readily understood from the following description given by way of example only, of five vehicle braking systems in accordance with the invention illustrated diagrammatically as shown in FIGS. 1–5 in the accompanying drawings.

The brake system shown in FIG. 1 includes front wheel brakes FW1, FW2 each having a pair of single ended wheel cylinders FC, and rear wheel brakes RW1, RW2 each having a dual chamber cylinder RC, corresponding chambers of which are connected to each other. The rear wheel brakes also have lock units RL for holding the shoes applied mechanically. These lock units are brought into operation by relieving them of fluid pressure, in a manner known in itself.

Fluid pressure is generated by an engine driven hydraulic pump 1, drawing hydraulic fluid from a reservoir 2 and supplying separate nitrogen filled accumulators 3A, 3B. The pump 1 comprises separate pump elements for the respective pressure circuits, and incorporates non-return valves, and an unloader device for maintaining the system pressure within required limits.

The accumulators 3A and 3B are separately connected to a dual chamber pressure gauge 15 and to a foot operated treadle valve 5 controlling the supply of fluid pressure to the various wheel brake cylinders. A hand operated valve 6 is also connected to the accumulators, and to the rear wheel cylinders RC. It also controls the supply of pressure fluid to the lock units RL. The valve 6 includes a gate which prevents the hand valve being operated to relieve the lock units of pressure to apply the lock when the pressure transmitted by the valve to the wheel cylinders RC exceeds a predetermined value. This is to prevent the lock units being applied under high brake shoe loadings, which could interfere with release of the lock units when next desired.

A further safeguard against this condition is provided by a service override valve 7, which is in effect an automatic change-over valve which prevents the lock units RL being relieved while the service brake pressure controlled by the foot pedal, exceeds a predetermined value.

The hand control valve 6 has two pressure outlet lines, which are branched into the pressure lines from the foot operated valve 5 at change-over valves 8. Finally load apportioning valves 14 are interposed in the pressure lines to the rear wheel cylinders, between the valve 5 and the change-over valves 8.

In service brake operation, the valve 5 is operated to pass pressure fluid from the accumulators 3A and 3B to the front wheel cylinders FC, the two cylinders on each brake each being fed by a different accumulator.

The rear wheel cylinders are supplied through the two apportioning valves 14 and change-over valves 8. One accumulator is connected to one chamber of each of the two rear wheel cylinders RC, and the other accumulator to the remaining chambers.

The hand controlled valve 6, used for parking and emergency braking, is connected to the rear wheel cylinders only, and to the lock units RL. This control is used to apply the rear brakes, relieve the locks of pressure, and then relieve the rear wheel cylinders of pressure, in that order, for applying the lock units to park the vehicle. The reverse sequence is used to release the rear brakes.

It will be noted that failure in any one of the four main pressure lines, i.e. two from foot valve 5 and two from hand control valve 6, will not affect the other lines, so that at least a useful proportion of full braking effort remains available at all wheel brakes. The branching in of the lines from the hand control valve, by passing the proportioning valve 14 avoids a reduction of braking pressure for parking (which is particularly important when parking a laden vehicle on an incline) or if the foot brake system fails.

Figure 2:
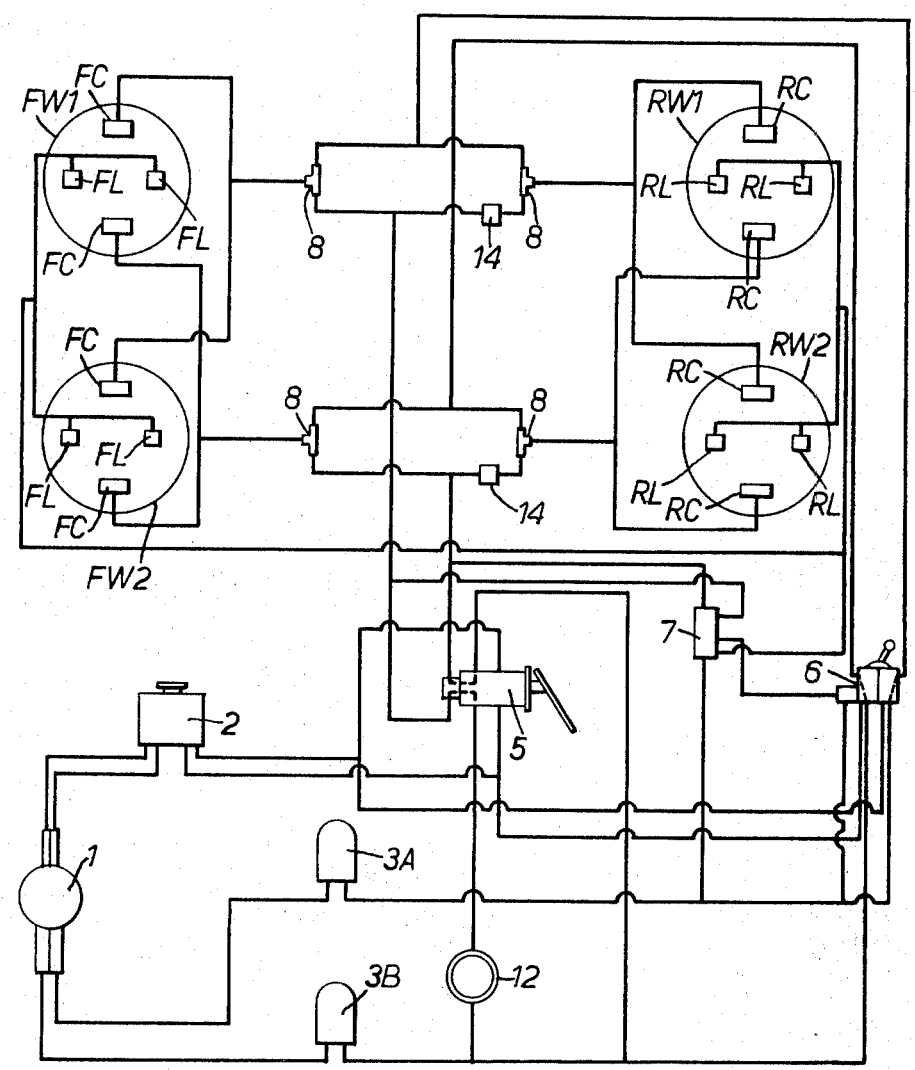

The system shown in FIG. 2 is similar in many respects to that of FIG. 1 and the same reference numerals are used to identify corresponding parts of the two figures. Only the principal differences need detailed description here.

Each of the four wheel brakes have two, single chamber, double piston wheel cylinders FC and RC and two lock units FL at the front and RL at the rear. The two lines from the hand control valve each serve one wheel cylinder on all four brakes, so that two further changeover valves 8 are required, these again being downstream of the apportioning valves 14 in the pressure lines from the foot valve 5. The manner of operation is generally similar to that for the FIG. 1 system.

Figure 3:
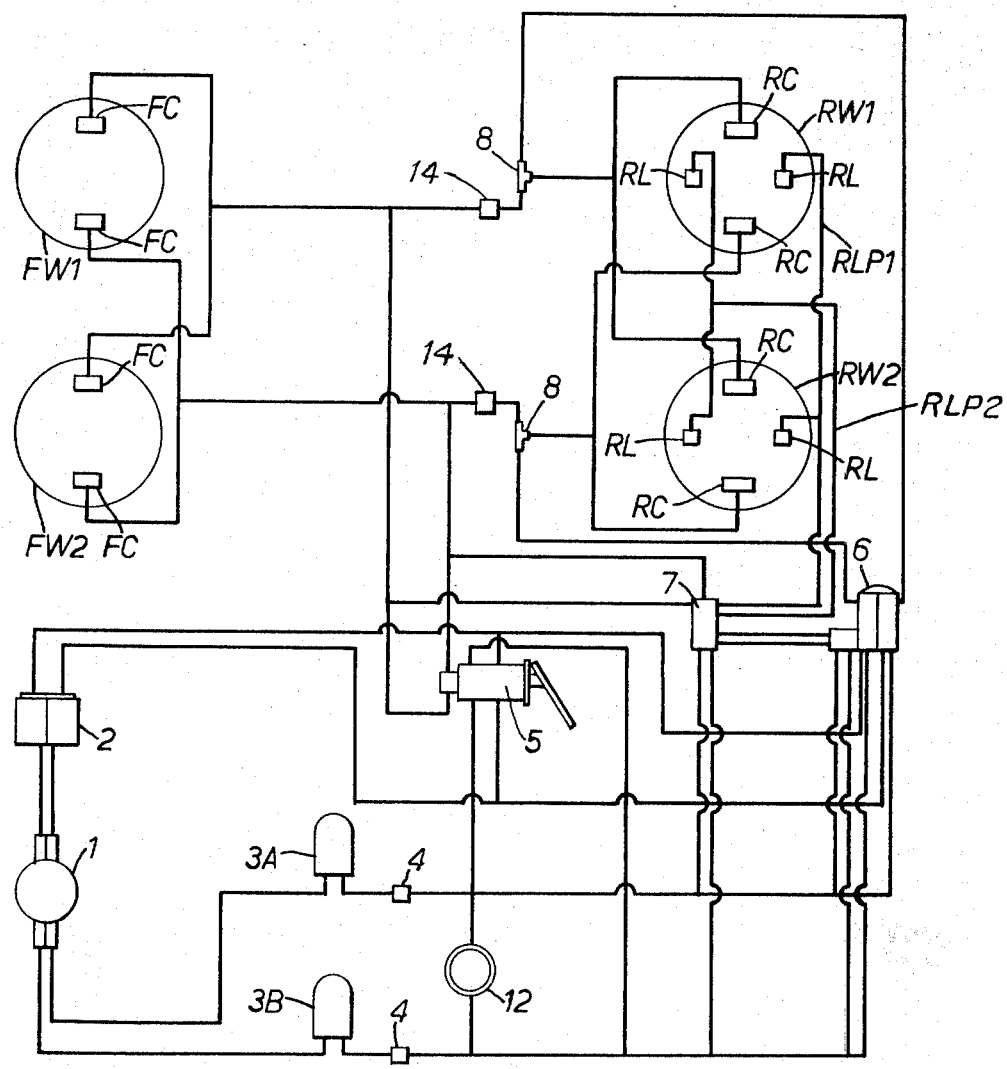

The system of FIG. 3 is like that of FIG. 2, except that the lock units RL are only fitted to the rear wheel brakes, and the pressure supply to the lock units is split, one lock unit on each brake being supplied through a line RLP1 and the remaining two units through a line RLP2. If either lock pressure line fails, pressure will be lost from the corresponding accumulator 3A or 3B and one wheel cylinder on each wheel brake will accordingly be inoperative. However, the other lock units and the wheel cylinders will be available for normal operation, without the applied pressure being "locked in" to the lock units.

Figure 4:
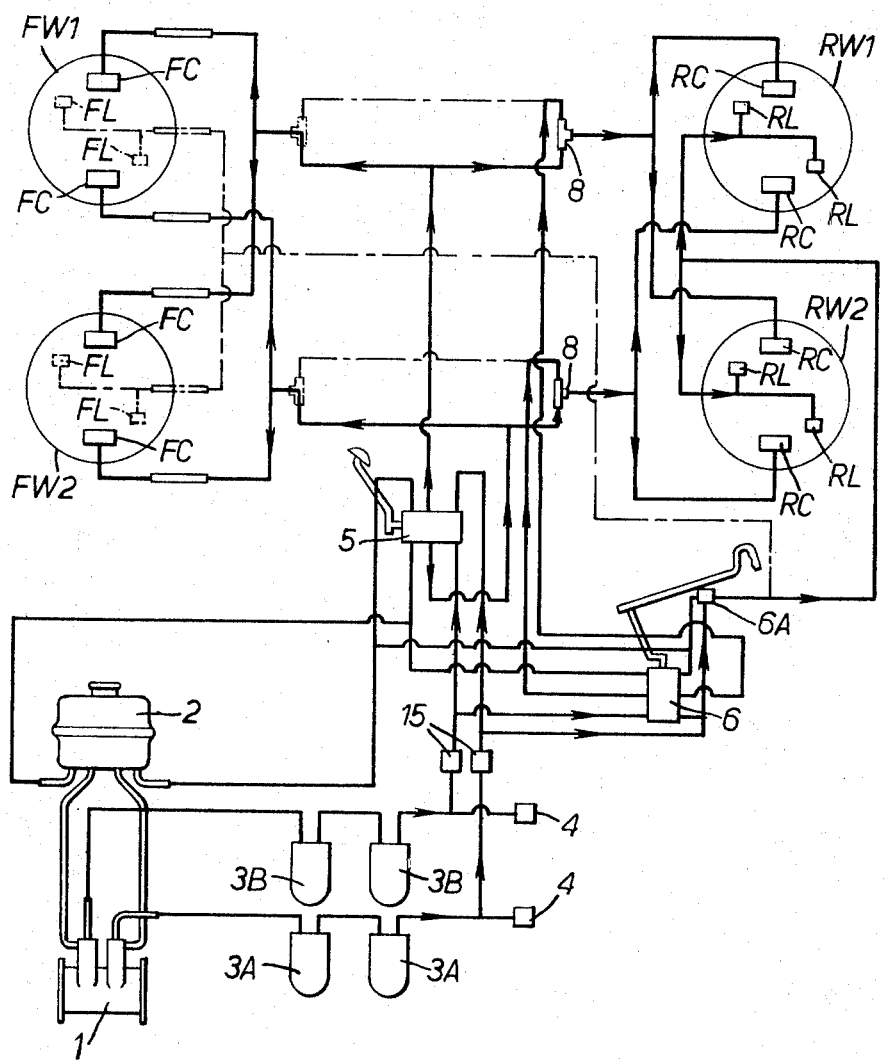

The system shown in FIG. 4 is generally similar to those of FIGS. 1 and 2, the principal differences being as follows. The hand control valve unit is physically split into separate elements 6 (controlling the supply of pressure to the wheel cylinders) and 6A (controlling the supply of pressure to the lock units), but both valve units are under the control of a common handbrake lever. The dual pressure gauge 12 is replaced by low pressure warning switches 4 for initiating a visual and/or audible signal in the event of pressure loss in either accumulator. This system optionally has connections from the hand control to the front wheel brakes, and lock units on the front wheel brakes, as indicated in broken lines.

Figure 5:
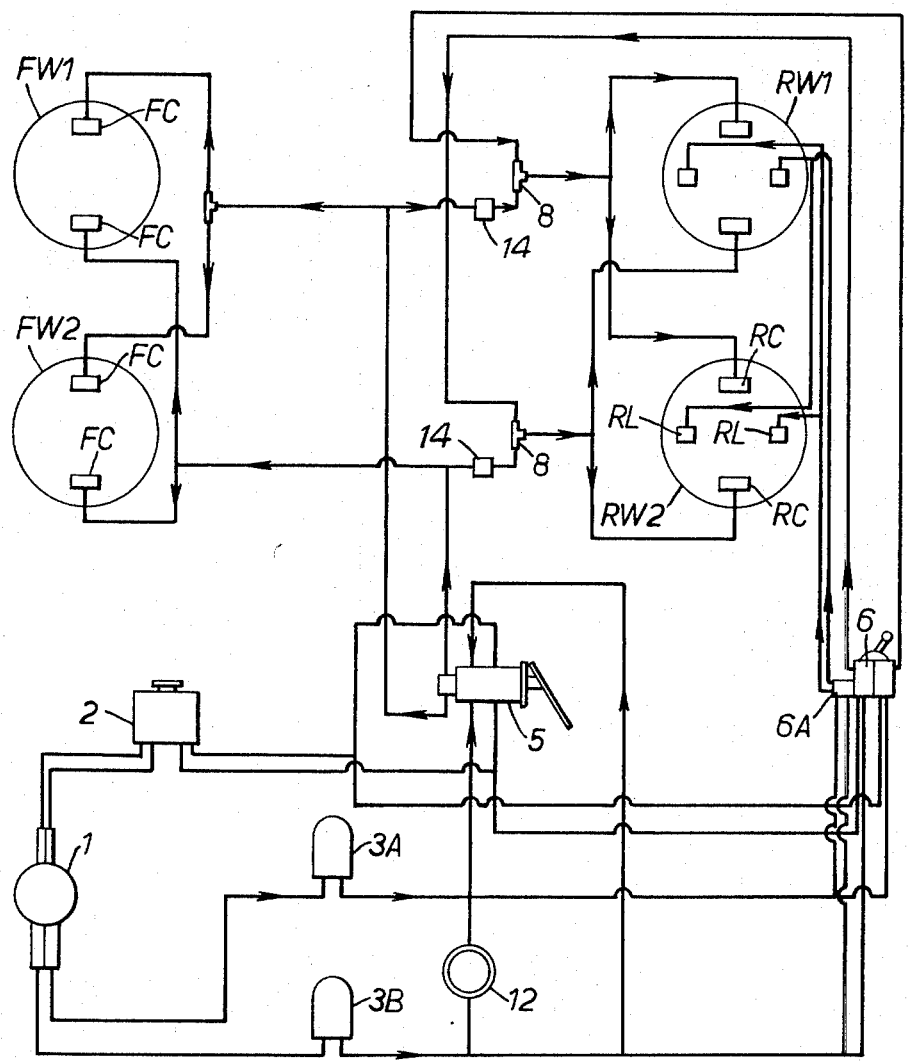

In each of the above described systems, failure of the hydraulic circuits to the lock units will result in the brakes being locked on, but in the system illustrated in FIG. 5 the lock units are of a type which are applied by the supply of fluid pressure thereto, and normally biased, by resilient means, to an unlocked condition. The system is very similar to that described with reference to FIG. 1, but in this system, the sequence for parking and unparking is as follows:

(1) Pressure applied to wheel cylinders RC, FC;
(2) Pressure applied to lock units RL;
(3) Pressure released from wheel cylinders;
(4) Pressure released from lock units.

Again, this is a completely split dual system, designed to provide leading/trailing shoe operation at all brakes for hand or foot application in the event of complete failure of either pressure system.

I claim:
1. A hydraulic vehicle braking system comprising:
 front and rear wheel brakes, each wheel brake having wheel cylinder means having at least two working chambers to which hydraulic pressure can be supplied for applying the brake;
 lock units on at least some of the wheel brakes for holding those brakes applied mechanically for parking purposes;
 two separate sources of hydraulic pressure;
 service brake control means operable to supply hydraulic pressure from each source to at least one respective working chamber of each wheel brake;
 emergency brake control means to supply hydraulic pressure from each source to respective ones of said working chambers on at least some of said wheel brakes;
 manually controlled hydraulic means for controlling operation of the said lock units;
 and changeover valve means through which one pressure line from the emergency brake control means is branched into one pressure line from the service brake control means leading to one working chamber, the said changeover valve means acting as a check valve to one said pressure line while passing pressure from the other said pressure line to the working chamber in question.

2. Braking system in accordance with claim 1, wherein said pressure sources are separate accumulators, the full pressure of which is available at the wheels by operation of said service and emergency brake control means and comprising interlock means for preventing operation of said lock units when said working chambers are exposed to the full pressure of said accumulators.

3. Braking system in accordance with claim 2 further including a unitary manual control for said emergency brake control means and said hydraulic means for controlling operation of the lock units and a gate arrangement for preventing operation of the lock units when said emergency brake control means is operated to pass a pressure above a predetermined maximum pressure.

4. A braking system in accordance with claim 2 including service brake override means which prevents operation of said lock units when a pressure above a predetermined maximum pressure is passed by said service brake control means.

5. A braking system in accordance with claim 1, including brake pressure reducer valve means inserted in respective pressure lines between said service brake control means and said changeover valves.

6. A braking system in accordance with claim 1, wherein each of said working chambers under the control of both said service brake control means and said emergency brake control means is supplied from one pressure source.

7. Braking system in accordance with claim 6 wherein each one of the said working chambers of said wheel cylinder means on all said wheel brakes is connected to one pressure source, through said service brake control means or said emergency brake control means.

8. Braking system in accordance with claim 1 wherein said lock units are fitted in pairs to different ones of said wheel brakes, said units of each pair being connected respectively to the two said pressure sources.

9. Braking system in accordance with claim 1, wherein said lock units are inherently biassed to an unlocked condition and are supplied with hydraulic pressure only when they are to be operated for parking.

References Cited
UNITED STATES PATENTS

| | | | |
|---|---|---|---|
| 3,513,946 | 5/1970 | Rick | 188—106 P X |
| 3,572,847 | 3/1971 | Luft | 303—13 |
| 3,582,150 | 6/1971 | Williams | 303—9 |

DUANE A. REGER, Primary Examiner

U.S. Cl. X.R.
188—106 P; 303—2